H. H. WALTON & P. GOTWALT.
NUT AND BOLT LOCK.
APPLICATION FILED OCT. 15, 1912.
1,083,471. Patented Jan. 6, 1914.
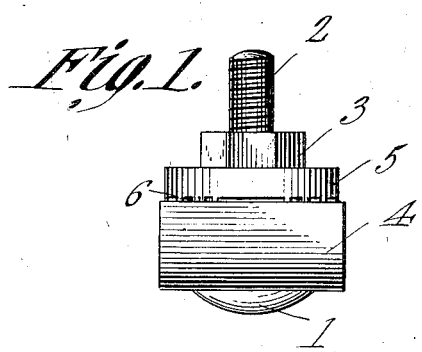
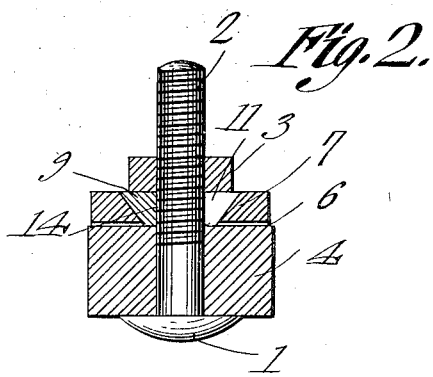
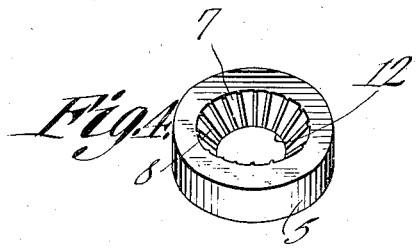
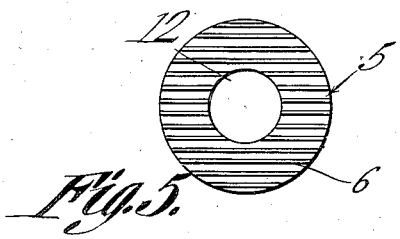
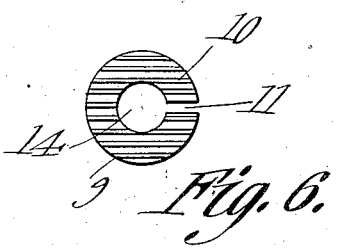
H. H. Walton and P. Gotwalt, Inventors
Witnesses
by C. A. Snow & Co., Attorneys

UNITED STATES PATENT OFFICE.

HARRY H. WALTON AND PAUL GOTWALT, OF HARRISBURG, PENNSYLVANIA.

NUT AND BOLT LOCK.

1,083,471. Specification of Letters Patent. Patented Jan. 6, 1914.

Application filed October 15, 1912. Serial No. 725,865.

*To all whom it may concern:*

Be it known that we, HARRY H. WALTON and PAUL GOTWALT, citizens of the United States, residing at Harrisburg, in the county of Dauphin, State of Pennsylvania, have invented a new and useful Nut and Bolt Lock, of which the following is a specification.

One object of the present invention is to provide a nut lock which may be assembled with any standard form of bolt, without working a change of any sort in the bolt or nut.

Another object of the invention is to provide a nut lock comprising nested washers, so constructed that moisture may find its way into the nut lock, to effect a rusting together of the parts.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

In the drawing:—Figure 1 is a side elevation; Fig. 2 is a transverse section; Fig. 3 is a perspective of the secondary washer; Fig. 4 is a perspective of the primary washer; Fig. 5 is a bottom plan of the primary washer; and Fig. 6 is a top plan of the secondary washer.

In the accompanying drawing, the numeral 1 indicates a bolt, the same being threaded as indicated at 2, to receive a nut 3. The material through which the bolt 1 passes is indicated by the reference character 4.

The invention further includes a primary washer, disposed about the bolt 1. The under face of the primary washer 5 is ribbed, or otherwise roughened as indicated at 6, for engagement with one face of the material 4. The washer 5 is provided with a conical recess 7, the slant wall of which may be ribbed or otherwise roughened, as indicated at 8.

Fitting in the recess 7 of the washer 5 is a resilient secondary washer 9, the outer end face of which is ribbed or roughened as indicated at 10, for engagement with the nut 3. The secondary washer 9 is divided as indicated at 11. The bores 12 and 14 of the washers 5 and 9 respectively, are of cylindrical form, and serve to receive the bolt 1.

In practical operation, the parts are positioned as shown in Figs. 1 and 2, saving for the fact that before the nut 3 is rotated into firm engagement with the secondary washer 9, the washer 9 will upstand slightly above the outer face of the primary washer 5. When the nut 3 is rotated to a firm seat against the secondary washer 9, the washer 9, being resilient, will be crowded into the recess 7 of the washer 5. The ribbed face 8 of the recess 7 will prevent rotation between the washers 5 and 9, the ribbed face 6 of the primary washer 5 preventing relative rotatory movement between the washer 5 and the material 4. Since the outer end face of the secondary washer 9 is ribbed or roughened as indicated at 10, this face 10, engaging the nut 3, will serve to hold the nut 3 against rotation upon the bolt 1.

It is to be observed, referring particularly to Fig. 2, that the nut 3 is of less diameter than the wider end face of the secondary washer 9. Consequently, one end of the slot 11 in the washer 9, will project beyond the periphery of the nut 3. Recalling the foregoing, and referring to Fig. 2, it will be seen that moisture may find its way readily into the recess 11, beyond the periphery of the nut 3, the moisture ultimately flowing materially between the primary washer 5 and the material 4, the ribbed or roughened form given to the end face of the washer 5, as indicated at 6, permitting moisture to find its way between the washer 5 and the material 4. Consequently, the members 4 and 5, particularly when the member 4 is fashioned from metal, will become rusted together, and relative rotation between these parts will thereby be prevented. Further, moisture finding its way into the recess 11 of the secondary washer 9 will find its way between the slant face of the washer 9 and the wall of the recess 7 in the primary washer 5, so that these washers will rust together.

Having thus described the invention, what is claimed is:—

A nut lock comprising a bolt and a nut thereon, one of which is rotatable; a primary washer surrounding the bolt and provided with a conical recess; and a secondary, conical, resilient washer in the recess and engageable by the rotatable element of the bolt and nut structure; the secondary washer having a transverse opening extended beyond the periphery of the rotatable element of the bolt and nut structure; the inner, material engaging end face of the primary washer being roughened to afford a grip and to permit moisture entering the opening beyond the periphery of the rotatable element of the bolt and nut structure, to pass between said end face of the primary washer and the material.

In testimony that we claim the foregoing as our own, we have hereto affixed our signatures in the presence of two witnesses.

HARRY H. WALTON.
PAUL GOTWALT.

Witnesses:
 HORACE K. OSMAN,
 H. K. DELLINGER.